US009483225B2

(12) United States Patent
Keränen et al.

(10) Patent No.: US 9,483,225 B2
(45) Date of Patent: Nov. 1, 2016

(54) METHOD, APPARATUS AND COMPUTER PROGRAM PRODUCT FOR JOINING THE DISPLAYS OF MULTIPLE DEVICES

(71) Applicant: NOKIA TECHNOLOGIES OY, Espoo (FI)

(72) Inventors: Jaakko Keränen, Tampere (FI); Hannu Korhonen, Kangasala (FI); Andres Lucero, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/939,494

(22) Filed: Nov. 12, 2015

(65) Prior Publication Data

US 2016/0062724 A1  Mar. 3, 2016

Related U.S. Application Data

(63) Continuation of application No. 12/756,796, filed on Apr. 8, 2010, now Pat. No. 9,213,480.

(51) Int. Cl.
*G06F 3/01* (2006.01)
*G06F 3/0488* (2013.01)
(Continued)

(52) U.S. Cl.
CPC ........... *G06F 3/1423* (2013.01); *G06F 1/1698* (2013.01); *G06F 3/017* (2013.01);
(Continued)

(58) Field of Classification Search
CPC ........ G06F 3/048; G06F 3/0488; G06F 3/14; G06F 3/1423; G06F 3/017
USPC ......................................... 715/702, 769, 761
See application file for complete search history.

(56) References Cited

U.S. PATENT DOCUMENTS 7,532,196 B2 * 5/2009 Hinckley ................ G06F 3/011
345/156
2003/0162556 A1 8/2003 Libes
(Continued)

FOREIGN PATENT DOCUMENTS

JP  H11-73153 A   3/1999
JP  2006-518507 A  8/2006
(Continued)

OTHER PUBLICATIONS

Search Report and Written Opinion for International Application No. PCT/FI2011/050096 mailed May 24, 2011.
(Continued)

*Primary Examiner* — Andrea Leggett
(74) *Attorney, Agent, or Firm* — Alston & Bird LLP (57) ABSTRACT

A method is provided for enhancing a user interface with a mobile device by joining the displays of multiple devices together to function together with one another. In particular, example methods may provide for detecting a first touch or drag event, receiving a message indicating a second touch or drag event from a nearby device occurring during the first touch or drag event, creating a join event, and providing for transmission of the join event to the nearby device. The method may also include updating a registry of nearby devices in response to receiving a message regarding a touch or drag event from a nearby device. The method may further include providing for presentation of content on a display of a device and direction of content to be presented on a display of the nearby device, wherein the content to be presented on the display of the nearby device is related to the content on the display of the device.

20 Claims, 8 Drawing Sheets

(51) Int. Cl.
*G06F 3/0484* (2013.01)
*G06F 3/14* (2006.01)
*G06F 1/16* (2006.01)
G06F 3/048 (2013.01)
H04M 1/725 (2006.01)

(52) U.S. Cl.
CPC ........ *G06F 3/0488* (2013.01); *G06F 3/04845* (2013.01); *G06F 3/04883* (2013.01); *G06F 3/01* (2013.01); *G06F 3/016* (2013.01); *G06F 3/048* (2013.01); *G06F 3/1446* (2013.01); *G06F 2200/1614* (2013.01); *G06F 2203/04806* (2013.01); *G09G 2356/00* (2013.01); *H04M 1/7253* (2013.01); *H04M 1/72561* (2013.01); *H04M 2250/10* (2013.01); *H04M 2250/22* (2013.01)

(56) References Cited

U.S. PATENT DOCUMENTS

| | | | |
|---|---|---|---|
| 2005/0093868 | A1 | 5/2005 | Hinckley |
| 2006/0146765 | A1* | 7/2006 | Van De Sluis ......... G06F 3/016 370/338 |
| 2007/0124503 | A1* | 5/2007 | Ramos .................... G06F 3/017 709/248 |
| 2008/0195735 | A1 | 8/2008 | Hodges et al. |
| 2009/0140986 | A1* | 6/2009 | Karkkainen .......... G06F 3/0486 345/173 |
| 2009/0319894 | A1 | 12/2009 | Markiewicz et al. |
| 2010/0020025 | A1 | 1/2010 | Lemort et al. |
| 2010/0262673 | A1 | 10/2010 | Chang et al. |
| 2010/0325559 | A1 | 12/2010 | Westerinen et al. |
| 2011/0037727 | A1 | 2/2011 | Lee et al. |
| 2011/0230178 | A1 | 9/2011 | Jones et al. |
| 2012/0062475 | A1* | 3/2012 | Locker ................... G06F 3/041 345/173 |

FOREIGN PATENT DOCUMENTS

| | | |
|---|---|---|
| JP | 2007-240964 A | 9/2007 |
| JP | 2009-236934 A | 10/2009 |
| TW | 2009 41314 A | 10/2009 |
| TW | 2010 01272 A | 1/2010 |
| WO | WO 2004/062131 A1 | 7/2004 |
| WO | WO 2004/075169 A2 | 9/2004 |
| WO | WO 2007/135776 A1 | 11/2007 |
| WO | WO 2009/074887 A1 | 6/2009 |
| WO | WO 2010/023459 A1 | 3/2010 |

OTHER PUBLICATIONS

Office Action for Japanese Application No. 2013-503145 dated Jan. 5, 2015.
Office Action for Korean Application No. 10-2012-7029240 dated Nov. 25, 2013, 4 pages.
Office Action for Russian Application No. 2012146408; dated Jan. 21, 2014.
Hinckley, K. et al., *Stitching: Pen Gestures that Span Multiple Displays*, AVI '04, dated May 25-28, 2004, 9 pages.
Merrill, D. et al., *Siftables: Towards Sensor Network User Interfaces*, Proceedings of the First International Conference on Tangible and Embedded Interaction (TEI'07) (Feb. 15-17, 2007) Baton Rouge, Louisiana, 4 pages.
*Cube World*; Radica Games Ltd.; retrieved on Feb. 18, 2014 from <http://web.archive.org/web/20100302041117/http://www.radicagames.com/cubeworld/index.php>.
*Siftables: Making the digital physical*; Sifteo Inc.; retrieved on Feb. 18, 2014 from <http://web.archive.org/web/20091213044715/http://sifteo.com/>.
Office Action for U.S. Appl. No. 14/939,494 dated Dec. 9, 2015.
Office Action for U.S. Appl. No. 12/756,796 dated Mar. 29, 2012.
Office Action for U.S. Appl. No. 12/756,796 dated Sep. 13, 2012.
Office Action for U.S. Appl. No. 12/756,796 dated Jan. 18, 2013.
Office Action for U.S. Appl. No. 12/756,796 dated Nov. 18, 2013.
Office Action for U.S. Appl. No. 12/756,796 dated May 12, 2014.
Office Action for U.S. Appl. No. 12/756,796 dated Oct. 1, 2014.
Office Action for U.S. Appl. No. 12/756,796 dated Feb. 25, 2015.
Notice of Allowance for U.S. Appl. No. 12/756,796 dated Aug. 11, 2015.
Office Action for Taiwanese Application No. 100112009 dated Mar. 9, 2016.
Supplementary European Search Report for Application No. 11 76 5126 dated May 12, 2016.
Supplementary European Search Report for Application No. EP 11 76 5126 dated May 12, 2016.
Hinkley, K., *Synchronous Gestures for Multiple Persons and Computers*, UIST '03, vol. 5, Issue 2 (Nov. 2003) 149-158.
Lucero, A. et al., *Collaborative Use of Mobile Phones for Brainstorming*, Mobile HCT '10 (Sep. 2010) 337-340.
Office Action for Japanese Application No. 2015-250889 dated Aug. 29, 2016 (9 pages).
Office Action for Taiwanese Application No. 10520991190 dated Aug. 10, 2016 (8 pages).
Bulletin [Online] [retrieved Aug. 1, 2016]. Retrieved from the Internet: <URL: http://www.hot.com/read.asp?class=4&id=13766>. (dated Mar. 6, 2009) 3 pages.

* cited by examiner

METHOD, APPARATUS AND COMPUTER PROGRAM PRODUCT FOR JOINING THE DISPLAYS OF MULTIPLE DEVICES

CROSS-REFERENCE TO RELATED APPLICATIONS

This application is a continuation of U.S. application Ser. No. 12/756,796, filed on Apr. 8, 2010, the contents of which are incorporated herein in their entirety.

FIELD OF INVENTION

Example embodiments of the present invention relate generally to displays and user interfaces of mobile devices and, in particular, to using multiple displays and/or user interfaces together to enhance the capabilities of the mobile devices.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are increasingly becoming small, portable computing devices that are capable of running a variety of applications and providing a user with a display on which they may watch video, view web pages, play interactive games, or read text. Devices are often small enough to fit into a pocket to achieve desired portability of these devices; however, as the capabilities of the devices increases, the displays of such devices are used to display large amounts of information and view objects which have traditionally been displayed on larger, less portable displays. It may be desirable to increase the usable display size of a mobile device while maintaining the portability.

BRIEF SUMMARY

In general, exemplary embodiments of the present invention provide an improved method of enhancing a user interface with a mobile device by joining the displays of multiple devices together to function together with one another. In particular, the method of example embodiments provides for detecting a first touch or drag even, receiving a message indicating a second touch or drag event from a nearby device occurring during the first touch or drag event, creating a join event, and providing for transmission of the join event to the nearby device. The method may further include receiving a message indicating the end of the second touch or drag event from the nearby device. The method may also include updating a registry of nearby devices in response to receiving a message regarding a touch or drag event from a nearby device. The join event may include join event rules and the join event rules may include data regarding content to be displayed on the nearby device. Detecting the first touch or drag event may include determining a drag event direction. The method may further include providing for presentation of content on a display of a device and providing for direction of content to be presented on a display of the nearby device, wherein the content to be presented on the display of the nearby device is related to the content presented on the display of the device.

According to another embodiment of the present invention, an apparatus is provided. The apparatus may include at least one processor and at least one memory including computer program code. The at least one memory and the computer program code may be configured to, with the at least one processor, cause the apparatus to detect a first touch or drag event, receive a message indicating a second touch or drag event from a nearby device occurring during the first touch or drag event, create a join event, and provide for transmission of the join event to the nearby device. The apparatus may also be configured to receive a message indicating the end of the second touch or drag event from the nearby device. The apparatus may also be configured to update a registry of nearby devices in response to receiving a message regarding a touch or drag event from a nearby device. The join event may include join event rules and the join event rules may include data regarding content to be displayed on the nearby device. Detecting the first touch or drag event may include determining a drag event direction. The apparatus may also be configured to provide for presentation of content on a display of a device and provide for direction of content to be presented on a display of the nearby device, wherein the content to be presented on the display of the nearby device is related to the content presented on the display of the device. Detecting the first touch or drag event may include detecting the direction of a touch moving from a first position to a second position on a touch-sensitive display.

A further embodiment of the invention may include a computer program product including at least one computer-readable storage medium having computer-executable program code instructions stored therein, the computer-executable program code instructions may include program code instructions for detecting a first touch or drag event, receiving a message indicating a second touch or drag event from a nearby device occurring during the first touch or drag event, creating a join event, and program code instructions for providing for transmission of the join event to the nearby device. The computer program product may further include program code instructions for receiving a message indicating the end of the second touch or drag event from the nearby device. The computer program product may also include program code instructions for updating a registry of nearby devices in response to receiving a message regarding a touch or drag event from a nearby device. The join event may include join event rules wherein the join event rules may include data regarding content to be displayed on the nearby device. The program code instructions for detecting a touch or drag event may include program code instructions for determining a drag event direction. The computer program product may further include program code instructions for presentation of content on a display of a device and program code instructions for directing content to be presented on a display of the nearby device, wherein the content to be presented on the display of the nearby device is related to the content presented on the display of the device. The program code instructions for detecting the first touch or drag event may include program code instructions for detecting the direction of a touch moving from a first position to a second position on a touch-sensitive display.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
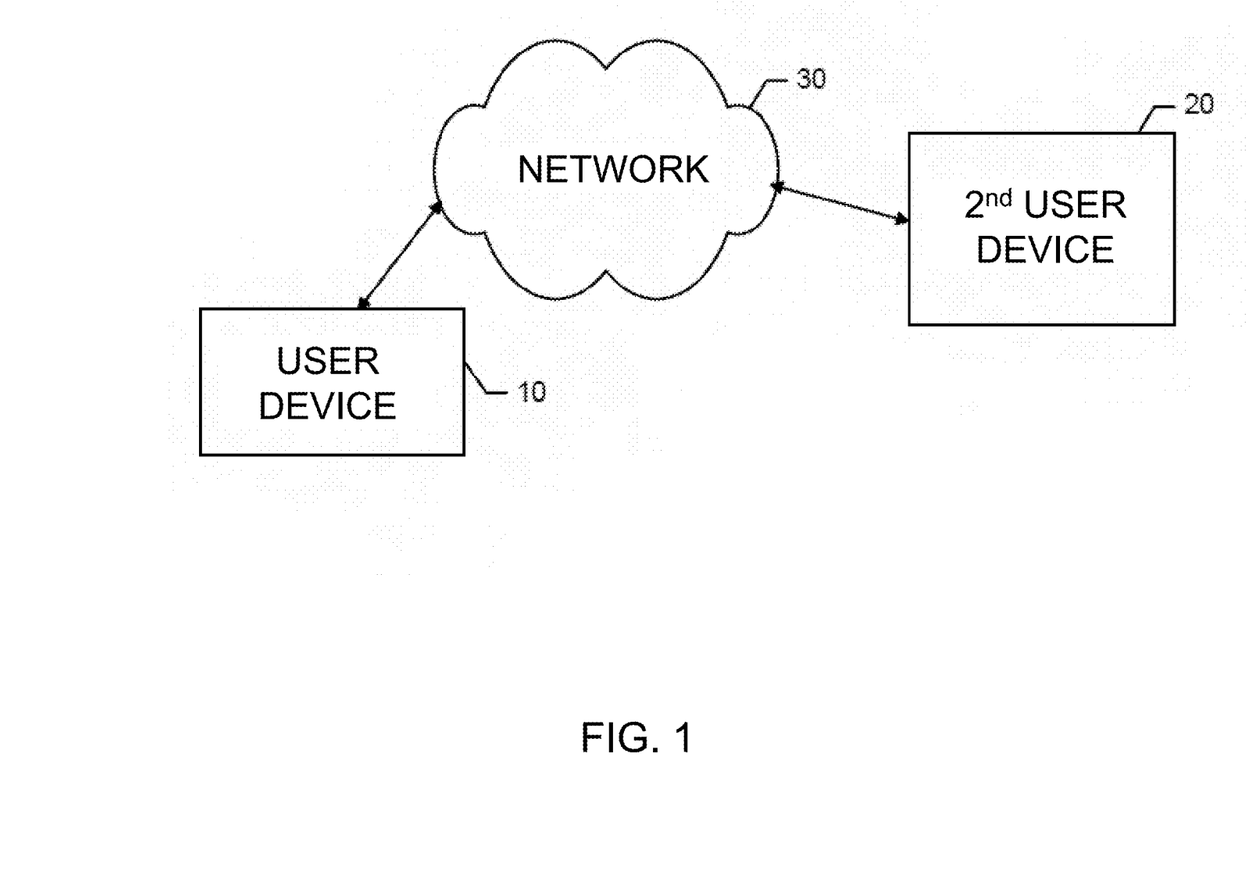
FIG. 1 illustrates an communication system in accordance with an example embodiment of the present invention.

A session may be supported by a network 30 as shown in FIG. 1 that may include a collection of various different nodes, devices or functions that may be in communication with each other via corresponding wired and/or wireless interfaces or in ad-hoc networks such as those functioning over Bluetooth®. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals such as the mobile terminal 10 and the second mobile terminal 20 may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the mobile terminal 10 and the second mobile terminal 20 via the network 30. By directly or indirectly connecting the mobile terminal 10 and the second mobile terminal 20 and other devices to the network 30, the mobile terminal 10 and the second mobile terminal 20 may be enabled to communicate with the other devices or each other, for example, according to numerous communication protocols including Hypertext Transfer Protocol (HTTP) and/or the like, to thereby carry out various communication or other functions of the mobile terminal 10 and the second mobile terminal 20, respectively.

In example embodiments, either of the mobile terminals may be mobile or fixed communication devices. Thus, for example, the mobile terminal 10 and the second mobile terminal 20 could be, or be substituted by, any of personal computers (PCs), personal digital assistants (PDAs), wireless telephones, desktop computer, laptop computer, mobile computers, cameras, video recorders, audio/video players, positioning devices, game devices, television devices, radio devices, or various other devices or combinations thereof.

Figure 2:
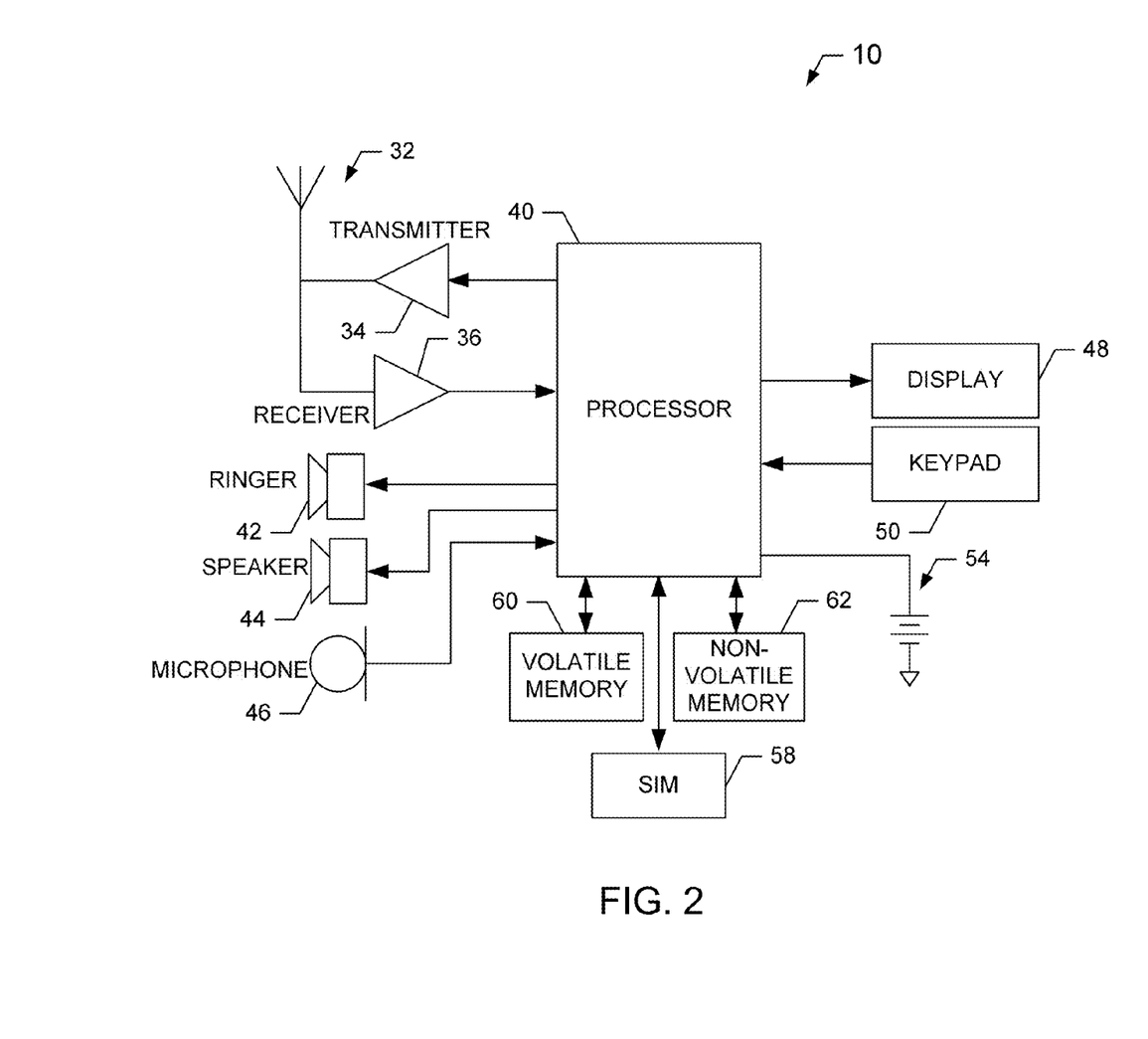
FIG. 2 is a schematic block diagram of a mobile device according to an example embodiment of the present invention.

Although the mobile terminal 10 may be configured in various manners, one example of a mobile terminal that could benefit from embodiments of the invention is depicted in the block diagram of FIG. 2. While several embodiments of the mobile terminal may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communication devices, may employ embodiments of the present invention. As described, the mobile terminal may include various means for performing one or more functions in accordance with embodiments of the present invention, including those more particularly shown and described herein. It should be understood, however, that a mobile terminal may include alternative means for performing one or more like functions, without departing from the spirit and scope of the present invention.

The mobile terminal 10 illustrated in FIG. 2 may include an antenna 32 (or multiple antennas) in operable communication with a transmitter 34 and a receiver 36. The mobile terminal may further include an apparatus, such as a processor 40, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the mobile terminal may be capable of operating in accordance with any of a number of first, second, third and/or fourth-generation communication protocols or the like. For example, the mobile terminal may be capable of operating in accordance with second-generation (2G) wireless communication protocols IS-136, GSM and IS-95, or with third-generation (3G) wireless communication protocols, such as UMTS, CDMA2000, wideband CDMA (WCDMA) and time division-synchronous CDMA (TD-SCDMA), with 3.9G wireless communication protocols such as E-UTRAN (evolved- UMTS terrestrial radio access network), with fourth-generation (4G) wireless communication protocols or the like.

It is understood that the apparatus, such as the processor 40, may include circuitry implementing, among others, audio and logic functions of the mobile terminal 10. The processor may be embodied in a number of different ways. For example, the processor may be embodied as various processing means such as processing circuitry, a coprocessor, a controller or various other processing devices including integrated circuits such as, for example, an ASIC (application specific integrated circuit), an FPGA (field programmable gate array), a hardware accelerator, and/or the like. In an example embodiment, the processor may be configured to execute instructions stored in a memory device or otherwise accessible to the processor. As such, the processor may be configured to perform the processes, or at least portions thereof, discussed in more detail below with regard to FIG. 4. The processor may also include the functionality to convolutionally encode and interleave message and data prior to modulation and transmission. The processor may additionally include an internal voice coder, and may include an internal data modem.

The mobile terminal 10 may also comprise a user interface including an output device such as an earphone or speaker 44, a ringer 42, a microphone 46, a display 48, and a user input interface, which may be coupled to the processor 40. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output.

The mobile terminal 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, i.e., cell id identity or cell id information, with which the mobile terminal is in communication.

An example embodiment of a communication network in accordance with one example embodiment is presented by FIG. 1. A flowchart illustrating operations performed by or in relation to the network of an example embodiment is presented in FIG. 4 and may be performed, for example, by the mobile terminal such as shown in FIG. 2. It will be understood that each block of the flowcharts, and combinations of blocks in the flowcharts, may be implemented by various means, such as hardware, firmware, processor, circuitry and/or other device(s) associated with execution of software including one or more computer program instructions. For example, one or more of the procedures described above may be embodied by computer program instructions. In this regard, the computer program instructions which embody the procedures described above may be stored by a memory device 60, 62 of an apparatus, such as a client, employing an example embodiment of the present invention and executed by a processor 40 in the apparatus. As will be appreciated, any such computer program instructions may be loaded onto a computer or other programmable apparatus (e.g., hardware), such as depicted in FIG. 2, to produce a machine, such that the resulting computer or other programmable apparatus embody means for implementing the functions specified in the flowchart block(s). These computer program instructions may also be stored in a computer-readable memory that may direct a computer or other programmable apparatus, e.g., the overlay network host, to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

In general, example embodiments of the present invention provide a method for enhancing and/or expanding a display and/or user interface of a mobile terminal using neighboring mobile terminals. For example, a first mobile terminal may display a web page, an application, or other object on a touch-sensitive display and upon detection of a particular motion recognized by the first mobile terminal and a nearby second mobile terminal, the displays may be virtually linked to display the object from the first mobile terminal.

Example embodiments of the present invention are described herein with reference to a mobile terminal comprising a touch-sensitive display (e.g., a touchscreen); however, embodiments of the present invention may be configured to be operable on various types of mobile terminals with single or multi-touch displays, displays with separate touch-pad user-interfaces, or other display types.

Embodiments of the present invention may comprise at least two fundamental operations. A first operation includes detecting an action that signals that the mobile terminal, such as mobile terminal 10, should be joined with a second mobile terminal. The action may include a pinch gesture while the fingers performing the pinch gesture are in contact with the touch-sensitive displays of the two mobile terminals. The second operation may allow the user interfaces of both of the mobile terminals to be modified according to a set of join event rules that may dictate how the joining of the user interfaces is executed based upon the first operation and the orientation of the mobile terminals. The join event rules may be dictated by the application(s) in use in one or both of the mobile terminals.

Figure 3:
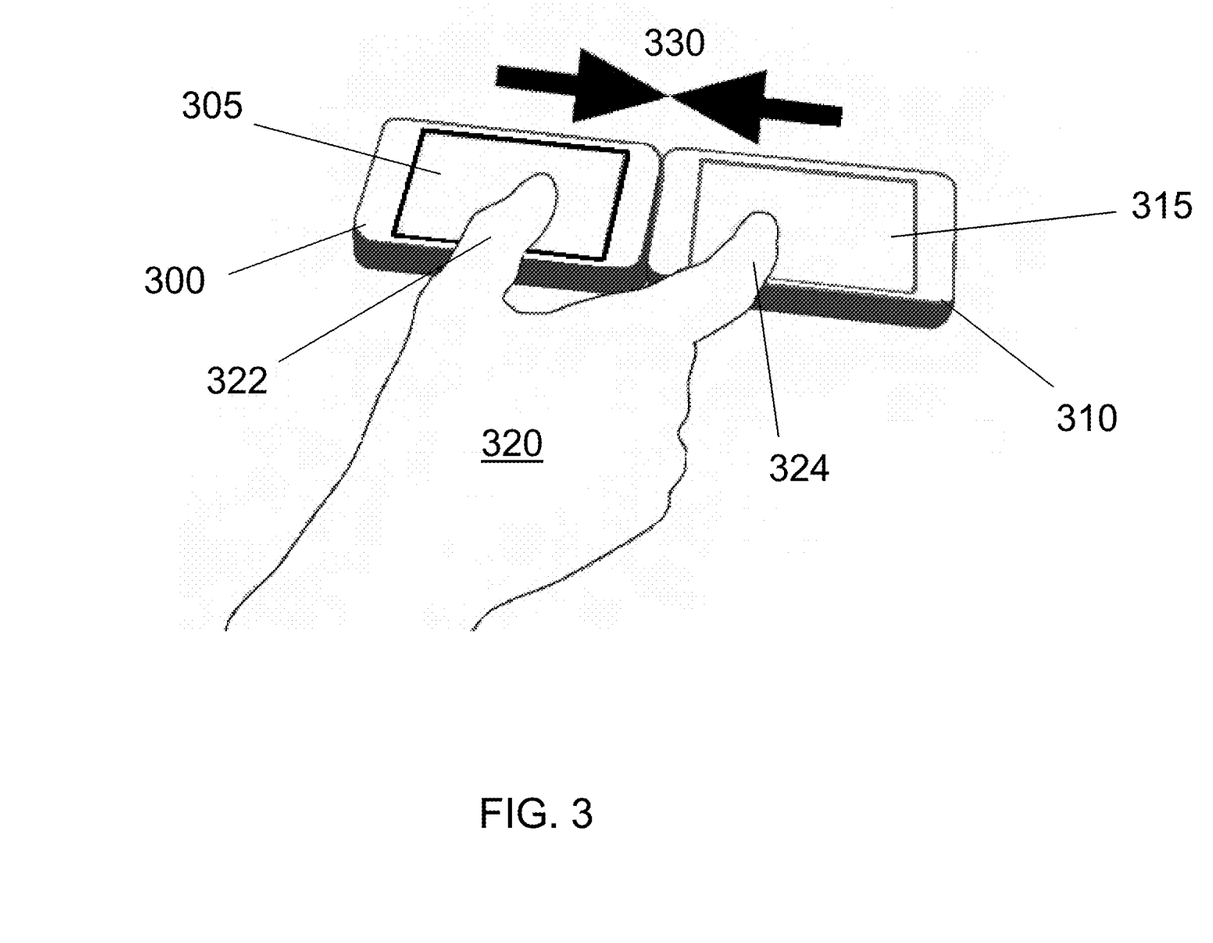
FIG. 3 illustrates an embodiment of a method for joining the displays of multiple mobile devices according to example embodiments of the present invention.

An example embodiment of the present invention is illustrated in FIG. 3 in which a first mobile terminal 300 and a second mobile terminal 310 are placed adjacent, or in close proximity to one another. A user 320 may use a first digit 322, such as a thumb, and a second digit 324, such as an index finger in a pinching motion (indicated by arrow 330) while in contact with a respective touch-sensitive display 305, 315. While the illustrated embodiment depicts a user's 320 fingers 322, 324, it should be appreciated that any touching device may be used, such as a stylus, on the touch-sensitive displays 305, 315. Further, the joining action may also be performed by fingers of two different hands (of the same or separate users), or touching devices belonging to two different users. The motion of the fingers 322, 324 may cause the terminals to join the touch-sensitive displays in a manner dictated by their orientation and the way in which the touch-sensitive displays were touched.

Figure 4:
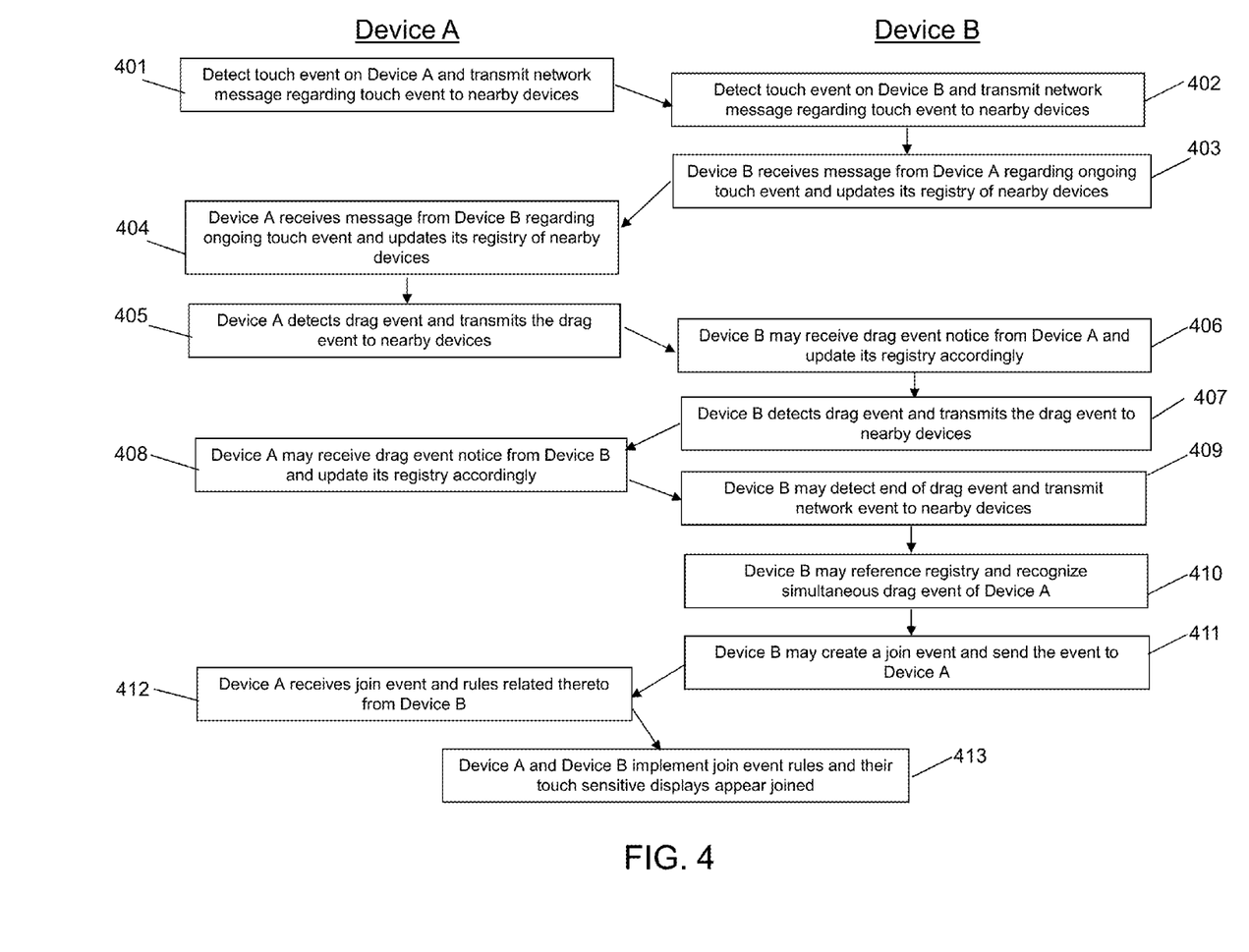
FIG. 4 is a flow chart of a method of joining the displays of multiple mobile devices according to an example embodiment of the present invention.

An example embodiment of a method of the present invention in which multiple user interfaces are joined together to operate in cooperation is shown in the flow chart of FIG. 4 where two terminals, mobile terminal A and mobile terminal B, are in close proximity to one another, and perhaps in physical contact. Mobile terminal A, may detect a touch event at coordinate location (x1, y1) of the touch-sensitive display (or touchscreen) of mobile terminal A at 401. Mobile terminal A may then transmit a network message to nearby devices (e.g., other mobile terminals) through a near-field communications method (such as Bluetooth® or Zigbee®). At substantially the same time (e.g., within a relatively small amount of time, such as 0.25 seconds), mobile terminal B may detect a touch event at coordinate location (s1, t1) of the touch-sensitive display of mobile terminal B at 402. Mobile terminal B may receive the message from mobile terminal A transmitted at 401 indicating that there is an ongoing touch event from (x1, y1) and mobile terminal B may update its registry of nearby devices accordingly at 403. Mobile terminal A may receive the message from mobile terminal B, transmitted at 402, indicating that there is an ongoing touch event from (s1, t1) and mobile terminal A may update its registry of nearby devices accordingly at 404. Mobile terminal A may detect that the touch event, detected at 401, is actually a drag event where the touch point has moved from (x1, y1) to (x2, y2) at 405. Mobile terminal A may determine which edge of the screen the drag event is moving toward: top, left, right, or bottom. For example, if x2−x1>|y2−y1|, it may be deduced that the drag event is toward the right edge of the screen where the coordinate system has an origin at the lower left corner of the screen, the positive x-axis is toward the right side of the screen, and the positive y-axis is toward the top of the screen. A network event about this may be sent to other nearby devices. Mobile terminal B may receive the message about the drag event on mobile terminal A toward the right edge and mobile terminal B may update its registry accordingly at 406. Mobile terminal B may detect that its touch event has become a drag event where the touch point has moved from (s1, t1) to (s2, t2) at 407. For purposes of the example herein, the direction may be calculated to be toward the bottom of the screen. Mobile terminal A may receive the message about the drag event on mobile terminal B and update the registry of the states of nearby devices accordingly at 408. Mobile terminal B may recognize that the drag event has ended as the user lifts their finger off of the display and mobile terminal B may send a network event about the end of the drag event to nearby devices at 409. Mobile terminal B may then check the registry of the states of nearby devices to determine if there are other simultaneous drag events occurring on any nearby devices. Mobile terminal B may recognize that mobile terminal A experienced a simultaneous drag event and the direction of the drag event of mobile terminal A. A join event may be created by mobile terminal B and transmitted to mobile terminal A at 411. Mobile terminal A may receive a message from mobile terminal B that the drag event of Mobile terminal B has ended and mobile terminal A may update its registry accordingly. Mobile terminal A may further receive the join event and rules of the join event from mobile terminal B at 412. Mobile terminal A may then apply the join event to its touch-sensitive display such that the touch-sensitive displays of mobile terminal A and mobile terminal B appear joined or cooperative based on the rules associated with the join event at 413. Mobile terminal A may recognize that the drag event on the touch-sensitive display of mobile terminal A has ended and transmits a signal indicating this event to nearby devices. Mobile terminal B receives the message from mobile terminal A and updates the registry of mobile terminal B accordingly.

In the aforementioned embodiment, the join event may be initiated by whichever device detects the lifting of the finger earlier, which then becomes the dominant device. In the embodiment depicted in FIG. 4, the finger or pointing device was lifted from mobile terminal B first such that mobile terminal B initiated the join event and becomes the dominant device. Mobile terminal A becomes the secondary device presenting the object of the dominant device according to the rules of the join event received from the dominant device. In the event that both devices detect the removal of the finger or end of their respective drag events substantially simultaneously, one of the join events will be detected as redundant. In the case of redundant join events, a request for user input to identify the dominant device may be presented on one or both devices. Optionally, the dominant device may be dictated by the application in use on the devices involved in the join event such that the join gesture has no impact on the determination of the dominant device.

FIG. 4 is a flowchart of systems, methods and program products according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In an example embodiment, an apparatus for performing the methods of FIG. 4 above may comprise a processor (e.g., the processor 70) configured to perform some or each of the operations (401-413) described above. The processor may, for example, be configured to perform the operations (401-413) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 401-413 may comprise, for example, the processor 70, the resource manager 80, and/or a device or circuit for executing instructions or executing an algorithm for processing information as described above.

Figure 5:
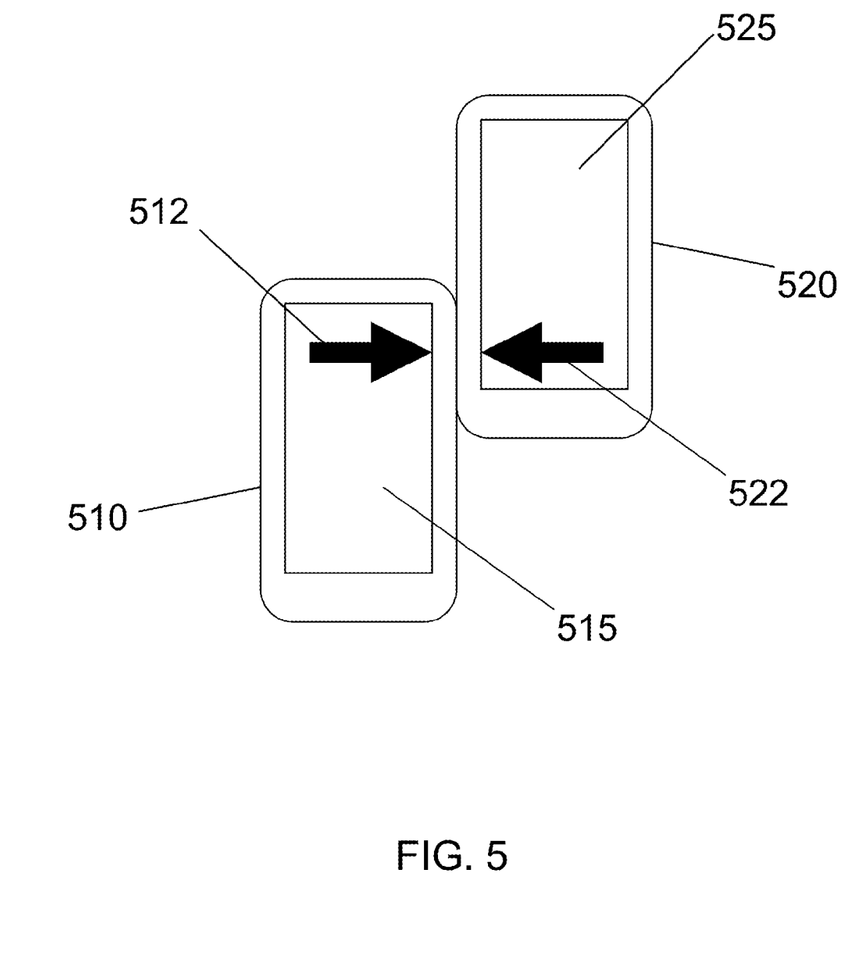
FIG. 5 illustrates an embodiment of a method for joining the displays of multiple mobile devices according to another example embodiment of the present invention.

The nature of the join event, and the rules associated thereto may be application dependent in order to optimize the application or object that is displayed on the dominant device. If a pinch gesture is used to initiate a join event, the devices involved in the join event may be aware of the drag events and toward which side of a touch-sensitive display they each occurred. If the drag event of the dominant device is to the right side of the touch-sensitive display while the drag event of the secondary device is to the bottom of the touch-sensitive display, the joining of the displays may include a virtual interface between the right edge of the touch-sensitive display of the dominant device and the bottom edge of the touch-sensitive display of the secondary device. The particular location of the drag events on the touch-sensitive displays may factor into some join events as illustrated in FIG. 5, wherein a drag event 512 on a dominant device 510 to the right edge of the top portion of a touch-sensitive display 515 and the drag event 522 to left edge on the bottom portion of a touch-sensitive display 525 of a secondary device 520 may cause a staggered virtual interface between the touch-sensitive displays. While join event rules of some applications may only use the relevant side of the touch-sensitive display related to the drag event and ignore the exact location, other applications may use the exact locations of the drag events to determine alignment of the devices to be joined.

As noted above, the nature of the join event and rules associated thereto may be application dependent such that under certain circumstances, mobile terminals that are joined may not be in a dominant-secondary relationship, but rather a collaborative relationship. Applications using a collaborative relationship may include games or applications that require a symbiotic data or information exchange.

An example application for which embodiments of the present invention may be implemented includes a virtual mind map as displayed on a first mobile terminal placed, for example, on a table top surface. A second mobile terminal may be placed adjacent to the first mobile terminal and a user may perform a pinch gesture between the touch-sensitive displays of each of the mobile terminals. The user may indicate through the pinch gesture or through a prompt by either terminal that the first mobile terminal is the dominant mobile terminal. The second terminal may then display a portion of the virtual mind map that was previously off-screen of the first mobile terminal as the second mobile terminal may function to expand the display area of the first mobile terminal. As noted above, the application, rather than the joining gesture, may be indicative of the dominant device. In the example application of a virtual mind map, the terminal displaying an assigned content-space viewing rectangle may automatically be recognized as the dominant device when joined with a terminal showing an overview of the virtual mind map and not yet having a content-space viewing rectangle assigned.

A technical implementation of the joining event of the aforementioned example application may include wherein the first mobile terminal is displaying a specific region of a larger virtual space, defined as a rectangle in content-space coordinates. The second mobile terminal may have no such defined region and may be displaying an overview of all content. When a drag event or pinch gesture is detected between the first mobile terminal and the second mobile terminal, with the first mobile terminal determined to be the dominant device, the join event is sent to the second mobile terminal. As noted above, since the second mobile terminal had no defined region, the application may cause the second mobile terminal to become the secondary device regardless of the nature of the join gesture. The join event rules may include the coordinates of where the drag or pinch event occurred on the first mobile terminal and the content-space rectangle being displayed on the first mobile terminal. The second mobile terminal may then display a content-space view rectangle that is aligned with the drag or pinch event that occurred between the two mobile terminals and supplements the displayed content-space view rectangle of the first mobile terminal.

Example embodiments of the join event may include join event rules or parameters to further define the join event and indicate how the mobile terminals involved in the join event are to interact. An example embodiment of a join event rule set may include relative orientations and the contacted edges. While applications such as a map-viewer may be conducive to embodiments that expand the viewable area when mobile terminals are joined, applications, including map-viewers, may offer alternative uses for the secondary device. For example, a dominant device may be executing an application for display of a map of a location. If the dominant device is joined with a secondary device by dragging to the right side of the dominant device touch-sensitive display (e.g., the secondary device is on the right side of the dominant device), the secondary device may show an expanded view of the map; however, if the dominant device is joined with a secondary device by dragging to the left side of the dominant device touch-sensitive display (e.g., the secondary device is on the left side of the dominant device), the secondary device may display map options such as zoom functions, location search options, topographical information, population statistics, etc. The function performed by the secondary device in response to the join event may be dictated by how the drag or pinch event is performed and the function that the secondary device is to perform may be included in the join event rules.

Figure 6:
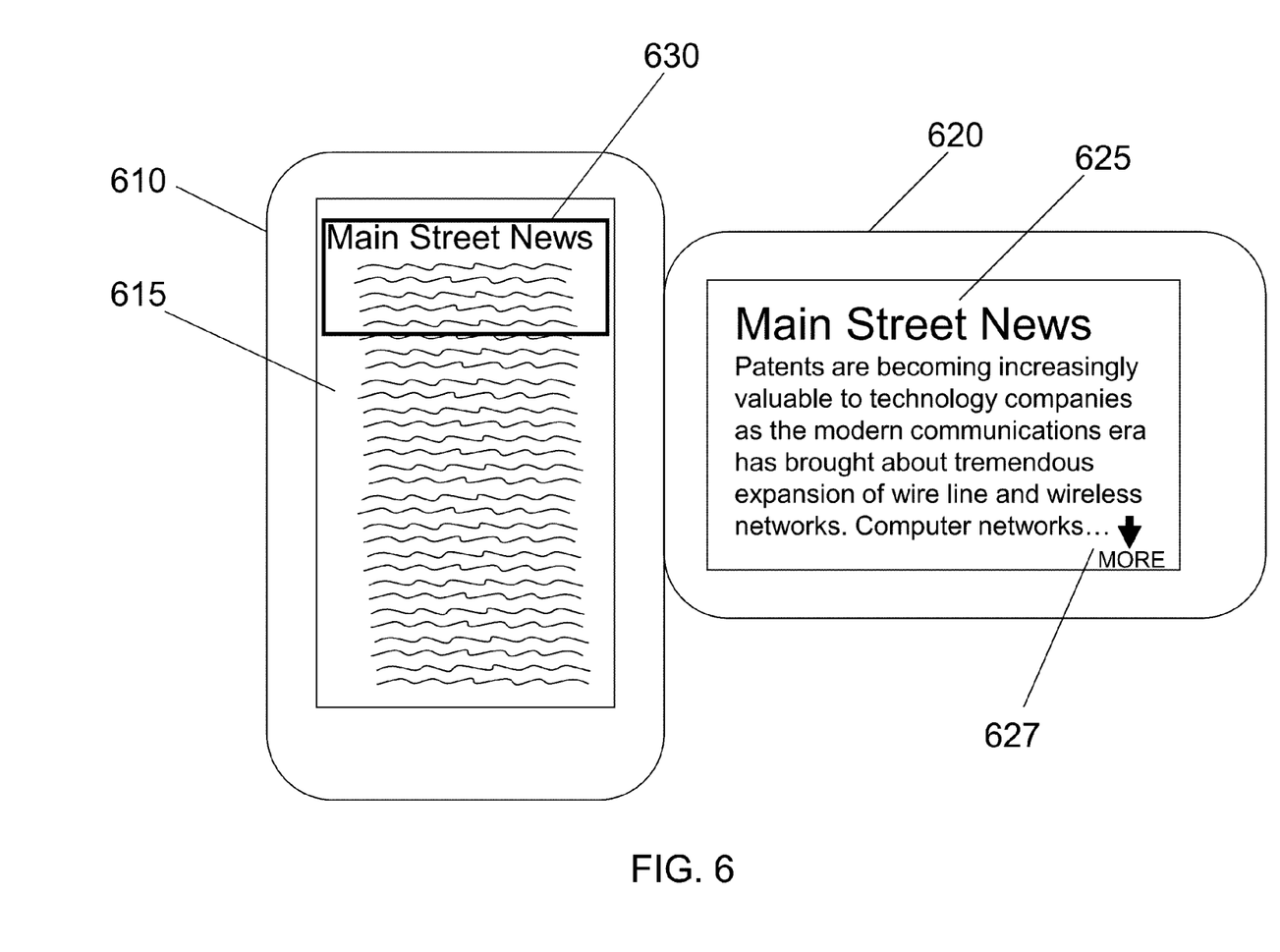
FIG. 6 illustrates an embodiment of the displays of multiple devices joined according to an example embodiment of the present invention.

Another example embodiment of join event rules may include join event rules that pertain to the orientation of the devices that are joined. For example, if a first mobile terminal includes a rectangular touch-sensitive display that is oriented vertically and a second mobile terminal includes a rectangular touch-sensitive display that is oriented horizontally, the relative orientation may affect how the join event rules are created and/or implemented. For example, as illustrated in FIG. 6, an application that is displaying a web page on the display 615 a first mobile terminal 610 may be joined with a secondary mobile terminal 620 that is oriented perpendicularly to the first mobile terminal. The second mobile terminal may be of an orientation that is better suited to web-page display such that the web page is displayed on the display 625 of the second mobile terminal 620 while an overview of the entire webpage, together with an indication of what area is being displayed on the second mobile terminal 620 is displayed on the first mobile terminal 610, such as the viewing rectangle 630 of the illustrated embodiment. Scrolling on the display of the secondary mobile terminal 620 may be accomplished by pressing/touching the "more" icon 627 of the second mobile terminal 620, or alternatively, by dragging the viewing rectangle 630 to the desired viewing area of the whole web page displayed on the touch sensitive display 615 of the first mobile terminal 610. For example, a user may touch the "more" icon 627 and they will be presented with the section of the web page displayed on the first mobile terminal 610 just below the viewing rectangle 630, and the viewing rectangle 630 will move accordingly. Optionally, a drag event of dragging a finger or other touching device towards the bottom of the touch sensitive display 625 of the second mobile terminal 620 may also scroll down the web page.

Figure 7:
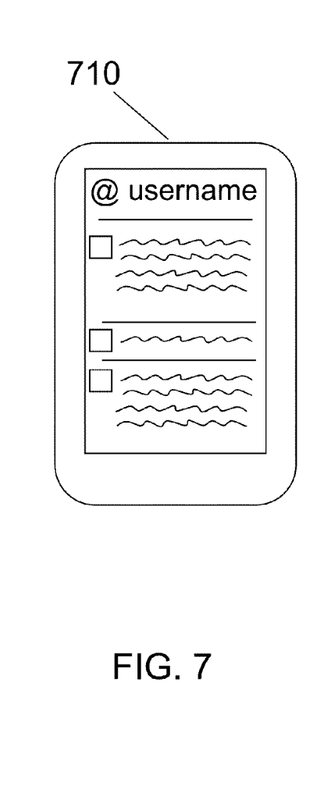
FIG. 7 illustrates a mobile device configured for implementing example embodiments of the present invention.
Figure 8:
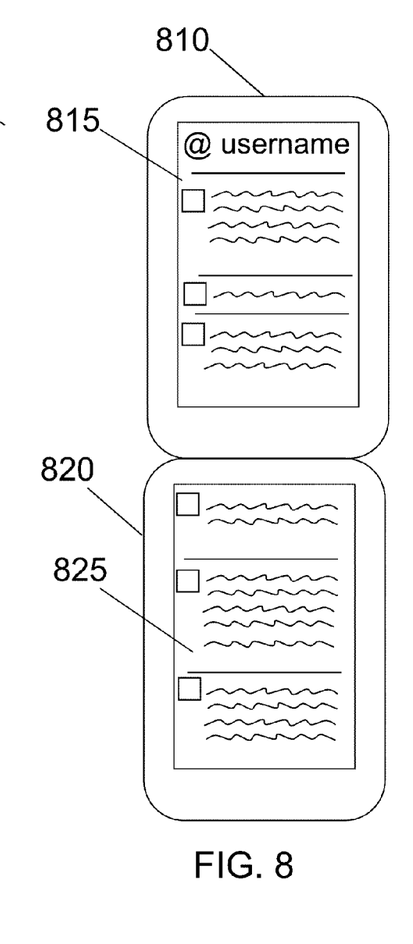
FIG. 8 illustrates an embodiment of the displays of two mobile devices joined according to another example embodiment of the present invention.
Figure 9:
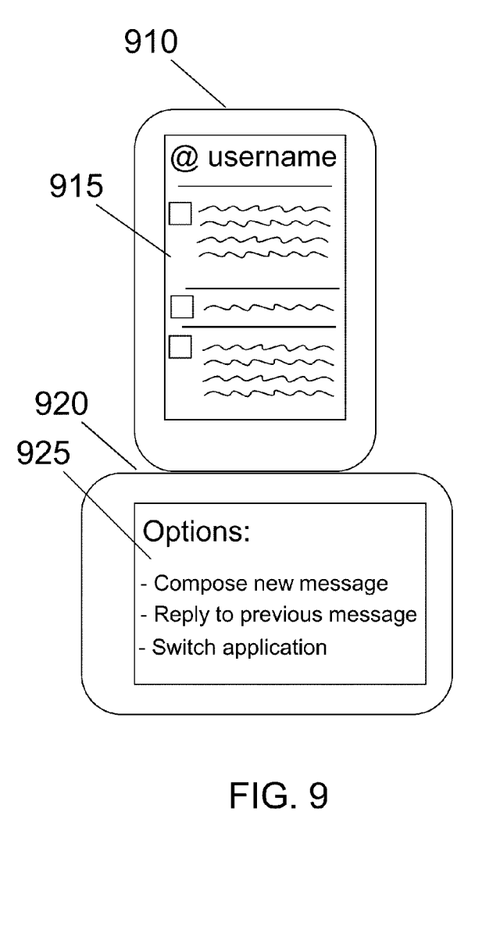
FIG. 9 illustrates an embodiment of the displays of two mobile devices joined according to still another example embodiment of the present invention.

Further example embodiments of the present invention are illustrated in FIGS. 7-9, wherein an application, such as a Twitter® account, is presented on the display 715 of mobile terminal 710. The mobile terminal 810 (the dominant device in the depicted example) may be joined with a secondary device, mobile terminal 820, as illustrated in FIG. 8, with the orientations of each device being parallel, joining the dominant device 810 through the bottom of the touch-sensitive display 815 and the secondary device through the top of the touch-sensitive display 825. The orientation of the mobile terminals 810, 820 and the application active on the dominant device 810 may dictate the join event rules that are sent to the secondary device 820. In the illustrated embodiment, the secondary device expands the display of the dominant device 810 to display additional information, and in the instant example, additional messages that were previously off-screen of the dominant device 810. FIG. 9 illustrates a mobile terminal 910 as the dominant device, similar to that of FIGS. 7 and 8; however, the secondary device (mobile terminal 920) is oriented perpendicularly to the dominant device 910. When the dominant device 910 is joined through the bottom of the touch-sensitive display 915 to the left side of the touch-sensitive display 925 of the secondary device 920 that is oriented with its left side facing the dominant device 910, the join event rules sent to the secondary device 920 may be different. In the illustrated embodiment, the join event rules cause the secondary device to display options rather than a continuation of the information that is displayed on the mobile terminal 910. Further, the join event rules may be configured by a user such that the user determines how a join event is to occur based on the variables of the drag direction, the application, and the relative orientations of the devices involved.

Figure 10:
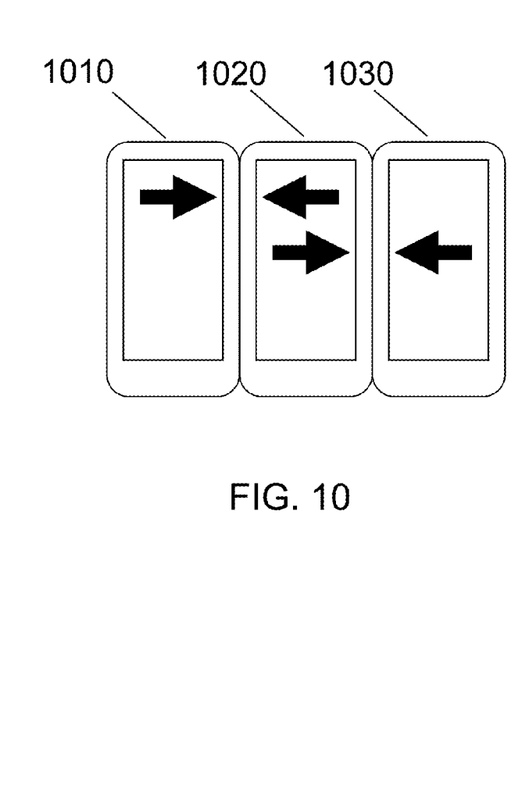
FIG. 10 illustrates an embodiment of a method for joining the displays of three mobile devices according to an example embodiment of the present invention.
Figure 11:
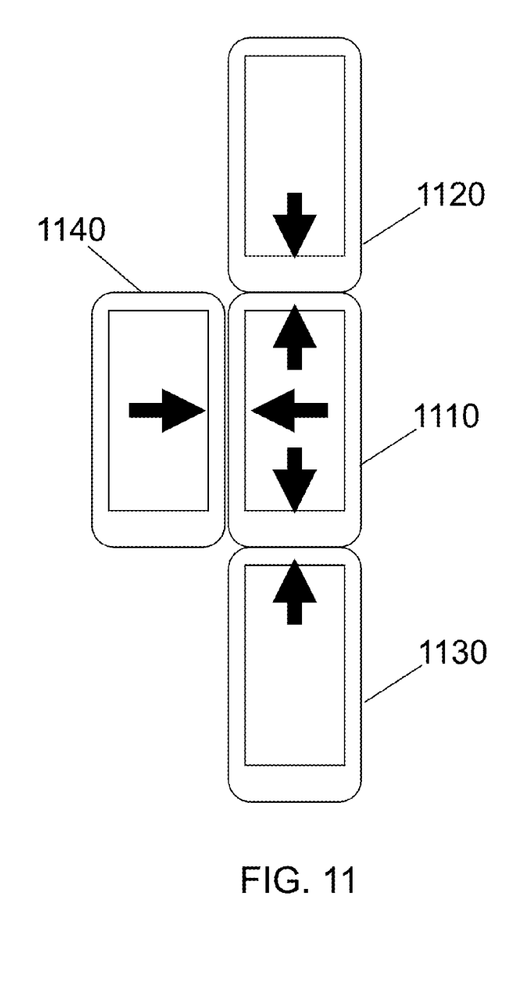
FIG. 11 illustrates an embodiment of a method for joining the displays of four mobile devices according to another example embodiment of the present invention.

Example embodiments of the present invention may join any number of mobile terminals as illustrated in FIGS. 10 and 11. FIG. 10 depicts three mobile terminals situated side-by-side and joined through a pinch gesture, with the arrows each indicating a touch and touch direction. The order in which the mobile terminals are joined may dictate which mobile terminal is the dominant device. For example, if mobile terminal 1010 is joined with mobile terminal 1020, and mobile terminal 1010 is the dominant device, when mobile terminal 1030 is joined to mobile terminal 1020, mobile terminal 1010 remains the dominant device and may dictate the join event rules based upon the application, the device orientation, and any previously joined devices, such as 1020. In such an embodiment, as mobile terminal 1020 detects the drag event, the drag event is communicated to both 1010 and 1030 for updating their registries. Upon determination that a join event has been initiated, since mobile terminal 1020 is already a secondary device to mobile terminal 1010, mobile terminal 1010 may transmit the join event rules. Optionally, the join event rules that are transmitted to mobile terminal 1020 when the join event is initiated between mobile terminal 1010 and mobile terminal 1020 may include join event rules for subsequently joined mobile terminals such that mobile terminal 1020 may transmit the join event rules to mobile terminal 1030. FIG. 11 illustrates another example embodiment wherein multiple devices are joined through more than one join event.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   detecting a first drag event that occurs on a display of a device;
   receiving a message indicating that a second drag event has occurred on a display of a nearby device during the first drag event;
   determining a relative orientation of the display of the device and the display of the nearby device on the basis of the first drag event and the second drag event corresponding with a user performing a pinching motion; and
   enabling the display of the device and the display of the nearby device to be joined in dependence on the determined relative orientation of the display of the device and the display of the nearby device.

2. The method according to claim 1, wherein the display of the device and the display of the nearby device are joined according to join event rules, created by the device, that depend on the determined relative orientation.

3. The method according to claim 1, further comprising: expanding information presented on the display of the device, during the first drag event, to the display of the nearby device.

4. The method according to claim 1, wherein the join event rules include data regarding content to be displayed on the nearby device.

5. The method according to claim 1, wherein detecting the first drag event comprises determining a drag event direction.

6. The method according to claim 1, further comprising:
   providing for presentation of content on the display of the device; and
   providing for direction of content to be presented on the display of the nearby device, wherein the content to be presented on the display of the nearby device is related to the content presented on the display of the device.

7. The method according to claim 1, wherein the display of the device and the display of the nearby device are joined differently when the display of the nearby device is oriented parallel to the display of the device than when the display of the nearby device is oriented perpendicular to the display of the device.

8. An apparatus comprising at least one processor and at least one memory including computer program code, the at least one memory and the computer program code configured to, with the at least one processor, cause the apparatus to at least:
   detect a first drag event that occurs on a display of a device;
   receive a message indicating that a second drag event has occurred on a display of a nearby device during the first drag event;
   determine a relative orientation of the display of the device and the display of the nearby device on the basis of the first drag event and the second drag event corresponding with a user performing a pinching motion; and
   enable the display of the device and the display of the nearby device to be joined in dependence on the determined relative orientation of the display of the device and the display of the nearby device.

9. The apparatus according to claim 8, wherein the first device is the apparatus or the first device comprises the apparatus.

10. The apparatus according to claim 8, wherein the at least one memory and the computer program code are configured to, with the at least one processor, cause the apparatus to join the display of the device and the display of the nearby device according to join event rules, created by the device, that depend on the determined relative orientation.

11. The apparatus according to claim 8, wherein the at least one memory and computer program code are configured to, with the at least one processor, cause the apparatus to:
   expand information presented on the display of the device, during the first drag event, to the display of the nearby device.

12. The apparatus according to claim 8, wherein the join event rules include data regarding content to be displayed on the nearby device.

13. The apparatus according to claim 8, wherein detecting the first drag event comprises determining a drag event direction.

14. The apparatus according to claim 8, wherein the at least one memory and the computer program code are configured to, with the at least one processor, cause the apparatus to provide for presentation of content on the display of the device and provide for direction of content to be presented on the display of the nearby device, wherein the content to be presented on the display of the nearby device is related to the content presented on the display of the device.

15. The apparatus according to claim 8, wherein detecting the first drag event comprises detecting the direction of a touch moving from a first position to a second position on a touch-sensitive display.

16. The apparatus according to claim 8, wherein the display of the device and the display of the nearby device are joined differently when the display of the nearby device is oriented parallel to the display of the device than when the display of the nearby device is oriented perpendicular to the display of the device.

17. A non-transitory computer-readable storage medium having computer-executable program code instructions stored therein, the computer-executable program code instructions including instructions for causing at least the following to be performed:
   detecting a first drag event that occurs on a display of a device;
   receiving a message indicating that a second drag event has occurred on a display of a nearby device during the first drag event;
   determining a relative orientation of the display of the device and the display of the nearby device on the basis of the first drag event and the second drag event corresponding with a user performing a pinching motion; and enabling the display of the device and the display of the nearby device to be joined in dependence on the determined relative orientation of the display of the device and the display of the nearby device.

18. The non-transitory computer-readable storage medium according to claim 17, wherein the display of the device and the display of the nearby device are joined according to join event rules, created by the device, that depend on the determined relative orientation.

19. The non-transitory computer-readable storage medium according to claim 17, further comprising: expanding information presented on the display of the device, during the first drag event, to the display of the nearby device.

20. The non-transitory computer-readable storage medium according to claim 17, wherein the join event rules include data regarding content to be displayed on the nearby device.

* * * * *